Figure 3:
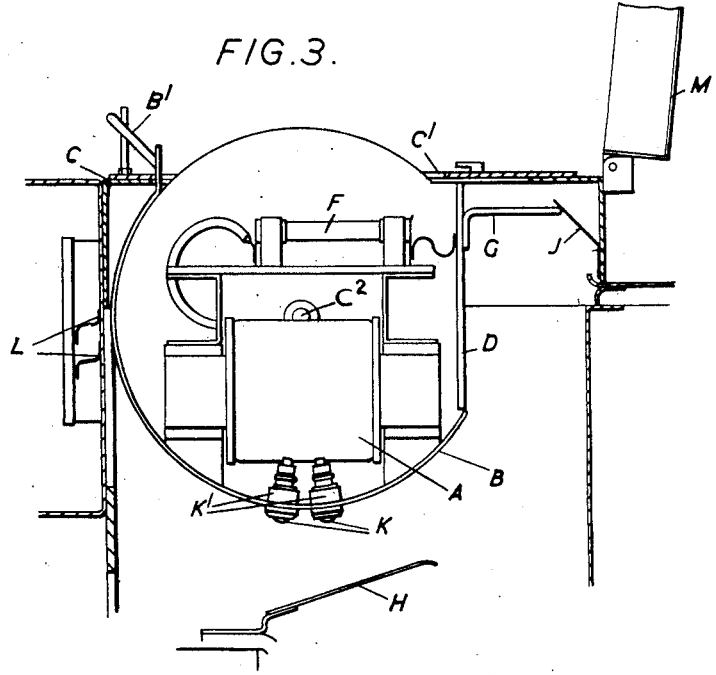

April 28, 1953     A. M. SOUTHWICK     2,636,929
HOUSING FOR ELECTRICAL COMPONENTS
Filed Aug. 8, 1950
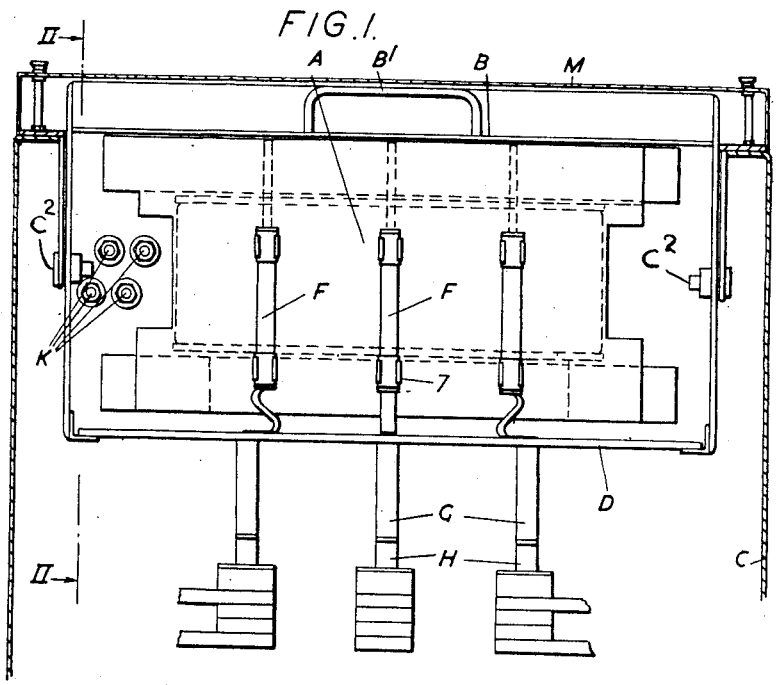
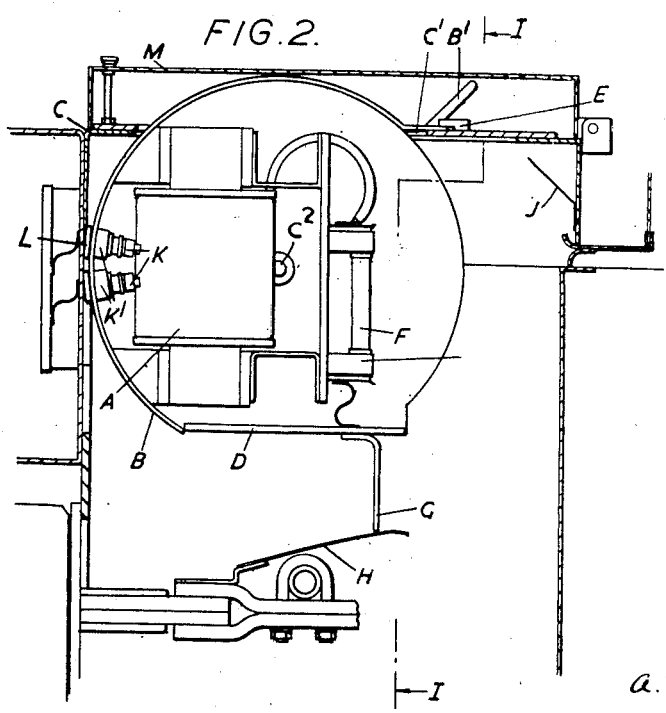
Inventor
A. M. Southwick
By Watson, Cole,
Grindle & Watson
Attorney April 28, 1953  A. M. SOUTHWICK  2,636,929
HOUSING FOR ELECTRICAL COMPONENTS
Filed Aug. 8, 1950  2 SHEETS—SHEET 2

Inventor
A. M. Southwick
By
Watson, Cole, Grindle & Watson
Attorney

Patented Apr. 28, 1953

2,636,929

UNITED STATES PATENT OFFICE 2,636,929

HOUSING FOR ELECTRICAL COMPONENTS

Alfred Matthew Southwick, South Shields, England, assignor to A. Reyrolle & Company Limited, Hebburn-on-Tyne, England, a company of Great Britain Application August 8, 1950, Serial No. 178,298
In Great Britain August 19, 1949

7 Claims. (Cl. 175—298)

This invention relates to housings for electrical components intended for connection to a supply and is concerned with components which it is desirable to isolate before rendering accessible for purposes such as maintenance. For example in the case of a voltage transformer connected to a high voltage supply it is important for the safety of the operator to provide means for isolating the transformer and its fuses before rendering it accessible for maintenance or replacement of fuses.

This has usually been achieved either by providing a separate isolating switch or arranging for withdrawal in a horizontal or vertical direction, but this demands additional space and may necessitate increased dimensions for the switchgear or may limit the space available for other parts.

According to the present invention a housing for one or more electrical components intended for connection to a supply comprises a stationary casing or enclosure, referred to herein as a casing, having an opening to give access to its interior, a support for supporting the components in the stationary casing, mounted so as to be rotatable between a live position and a maintenance position, and having a shroud which closes the said opening in the live position but allows access to the interior in the maintenance position, and stationary and moving contacts whereof the latter are mounted to rotate with the support in such manner as to connect the components to the stationary contacts in the live position but to isolate them therefrom in the maintenance position.

In one form of the invention one or more of the stationary contacts are arranged to be shielded by the support or a part carried thereby when in the maintenance position. For example the shroud may form part of an inner casing enclosing the components except for an opening which, in the maintenance position, coincides approximately with that of the outer casing. In this case the contacts may be arranged outside the inner casing and inside the outer casing so that in the maintenance position the shroud or other parts of the inner casing will shield the operator from the live stationary contacts.

Preferably the housing includes also one or more stationary earthing contacts arranged to be engaged by one or more moving contacts in the maintenance position so as to connect the components to earth as well as isolating them.

In one arrangement for housing a voltage transformer the rotatable support includes an insulating panel which may form part of an inner casing and the high voltage primary moving contacts are supported by the said panel and project outwardly from it. In this arrangement the secondary moving contacts project through the wall of an inner casing at a position angularly spaced about the axis of rotation from the primary contacts. The rotatable support also carries fuses connected to the transformer and arranged so as to be presented towards the opening when the support is in the maintenance position.

Figure 4:
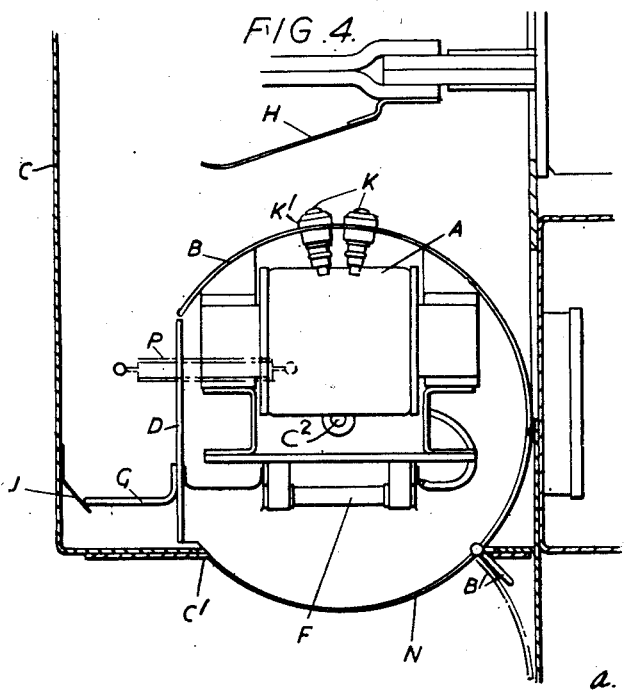

The invention may be carried into practice in various ways but one specific embodiment will be described by way of example, with reference to the accompanying drawings, in which:

Figure 1 is a front sectional elevation of a housing containing a voltage transformer, on the line I—I of Figure 2, Figure 2 is an end sectional elevation on the line II—II of Figure 1 with the parts in the live position, Figure 3 is a view similar to Figure 2 with the parts in the maintenance position, and Figure 4 is a view similar to Figure 3 of a modified construction.

In this example a 3.3 kv. voltage transformer A is contained in an inner rotatable casing B which in turn is located in an outer stationary casing or enclosure C. The outer casing may be of any convenient shape, for example rectangular, and may form part of associated equipment such as switchgear. In its upper surface it has an elongated rectangular opening C' to provide access to the components within it. The inner casing B is of generally cylindrical form mounted by pivots $C^2$ in the outer casing to rotate about its axis which is horizontal. About half of the periphery of the inner casing is constituted by a semi-cylindrical metal wall whilst a further quarter is afforded by a flat insulating panel D and the remaining quarter is open to provide access to the interior. In operation the inner casing is arranged to turn through about a right angle from a maintenance position, shown in Figure 3, in which the opening of the inner casing coincides with that of the outer casing, to a live position, shown in Figure 2, in which the opening in the outer casing is closed by a portion of the cylindrical wall of the inner casing. The inner casing is provided with a handle B' for moving it from its maintenance position to its live position, and the arrangement of the components within it is such that its weight tends to bias it towards the maintenance position. A latch E is provided to retain it in the live position.

The transformer is provided with fuses F also supported within the inner casing, the fuses being presented towards the opening in the inner casing so that when it is moved to its maintenance position the fuses wil be readily accessible through the opening in the stationary casing. The fuses are connected on the one hand to the high voltage primary windings of the transformer and on the other hand to a number of primary moving contacts G carried by the insulating panel D from which they project outwardly. Within the stationary casing are mounted a corresponding number of co-operating stationary contacts H which are engaged by the primary moving contacts when the casing is in the live position. One or more earthing contacts J are also provided in the stationary casing in such a position as to be engaged by the primary moving contacts when the inner casing is moved to the maintenance position, so that the windings are not only isolated but are also earthed when accessible to the operator.

A number of moving secondary contacts K extend with suitable insulating bushes K' through holes in the cylindrical wall of the inner casing and in the live position engage a corresponding number of stationary secondary contacts L. In the particular example in question in the live position shown in Figure 2 the panel carrying the primary moving contacts lies horizontally at the bottom of the inner casing whilst the secondary moving contacts are approximately level with the axis at what may be termed the front of the casing. When the inner casing is moved to the maintenance position shown in Figure 3 the secondary moving contacts are at the bottom whilst the panel carrying the primary moving contacts is at the back. As shown in Figure 1 the secondary moving contacts are arranged at one end of the casing so that they are spaced well away from the stationary primary contacts and in any case the latter are at a considerably greater radial distance from the axis, the primary moving contacts projecting a corresponding distance.

The outer casing may be provided with an outer cover M fitting over the top of the opening to exclude dust or make the assembly drip-proof. This cover may be omitted if not required.

Where it is desirable that the voltage transformer should be immersed in a liquid the outer casing may take the form of a liquid-filled tank.

Figure 4 shows a modified arrangement which is very similar to that of Figures 1 to 3 turned upside down so that the opening in the stationary casing is at the bottom. In addition instead of a cover M on the outer casing this opening is closed by a cover N hinged to the inner casing, and shaped to form a continuation of its cylindrical surface when closed. In this arangement a helical tension spring P is provided tending to turn the inner casing towards the maintenance position. In other respects this arrangement is similar to that of Figures 1 to 3 and bears the same reference letters.

It will be appreciated that the invention is not limited to the particular arrangements described by way of example. Thus the inner rotatable support need not be in the form of a complete casing although it is preferable that it should shield the operator from the live stationary contacts when in the maintenance position. Again the invention is not confined to voltage transformers, but may be applied to other electrical components, such for example as switchgear, which it is desirable to isolate before rendering accessible for maintenance. The rotatable support need not be arranged for rotation about a horizontal axis, but could be mounted to rotate about a vertical axis.

What I claim as my invention and desire to secure by Letters Patent is:

1. The combination with a transformer having a primary winding for connection to a supply, and a secondary winding, of a housing comprising a stationary enclosure having an opening to give access to its interior, a support supporting the transformer in the enclosure mounted so as to be rotatable between a live position and a maintenance position, a shroud so carried by the support that in the live position it closes the said opening but in the maintenance position it allows access to the interior, stationary primary and secondary contacts, and moving primary and secondary contacts connected respectively to the said primary and secondary windings and mounted to rotate with the support to engage the corresponding stationary contacts in the live position but not in the maintenance position.

2. The combination with a transformer having a high voltage primary winding intended for connection to a supply, of a housing comprising a stationary enclosure having an opening to give access to its interior, an inner casing including an insulating panel and mounted in the enclosure so as to be rotatable between a live position and a maintenance position and shaped so as to enclose the transformer except for an opening which in the maintenance position coincides at least approximately with that in the enclosure primary and secondary stationary contacts, and primary and secondary moving contacts whereof the primary moving contacts are electrically connected to the said primary winding and project outwardly from the said panel so as to rotate with the inner casing to engage the primary stationary contacts and connect the primary winding to them in the live position but not in the maintenance position.

3. The combination claimed in claim 2, in which the inner casing includes a part cylindrical wall and the secondary moving contacts project through the said part cylindrical wall at a position angularly spaced about the axis of rotation from the primary contacts.

4. A housing for an electrical component intended for connection to a supply source, comprising a stationary enclosure having an opening to give access to its interior, an inner casing, means supporting said component within said casing, said casing having an opening therein, mounting means supporting said casing within and in spaced relation to said enclosure for rotation between a live position in which it closes the opening in the enclosure and a maintenance position in which said openings are in substantial registry and in which the component is otherwise enclosed by said casing, cooperating stationary and moving contacts located outside the inner casing and inside said enclosure, means mounting the stationary contacts on said enclosure and the moving contacts on the inner casing, and means for connecting said moving contacts to said component and said stationary contacts to a supply source, said cooperating contacts being so disposed as to connect the component to the stationary contacts in the live position but to isolate the component therefrom by movement of the inner casing to the maintenance position.

5. A housing as claimed in claim 4 including at least one stationary earthing contact positioned for engagement by at least one of the moving contacts in the maintenance position so as to connect the component to earth as well as isolating it.

6. A housing as claimed in claim 4 including means biassing the inner casing toward the maintenance position, and a latch to retain it in the live position.

7. A housing as claimed in claim 4 in which the center of gravity of the rotating parts is located so as to bias them toward the maintenance position, and a latch to retain them in the live position.

ALFRED MATTHEW SOUTHWICK.

References Cited in the file of this patent

UNITED STATES PATENTS

| Number | Name | Date |
|---|---|---|
| 1,126,788 | Kries | Feb. 2, 1915 |
| 1,692,064 | Trogner | Nov. 20, 1928 |
| 1,809,025 | Cruser | June 9, 1931 |
| 2,486,764 | Singer | Nov. 1, 1949 |
| 2,496,183 | Thias | Jan. 31, 1950 |
| 2,527,269 | Killian | Oct. 24, 1950 |